(12) United States Patent
Hart et al.

(10) Patent No.: US 9,893,668 B2
(45) Date of Patent: Feb. 13, 2018

(54) CONTROL SYSTEM AND METHOD (71) Applicant: Control Techniques Limited, Newtown (GB)

(72) Inventors: Simon David Hart, Welshpool (GB); Michael Cade, Newtown (GB); Richard Mark Wain, Newtown (GB)

(73) Assignee: NIDEC CONTROL TECHNIQUES LIMITED, Newtown (GB)

( * ) Notice: Subject to any disclaimer, the term of this patent is extended or adjusted under 35 U.S.C. 154(b) by 462 days.

(21) Appl. No.: 13/946,541

(22) Filed: Jul. 19, 2013

(65) Prior Publication Data
US 2014/0028239 A1   Jan. 30, 2014

(30) Foreign Application Priority Data
Jul. 27, 2012 (GB) .................................. 1213526.5

(51) Int. Cl.
*H02P 27/06* (2006.01)
*H02P 29/60* (2016.01)
(Continued)

(52) U.S. Cl.
CPC ............ *H02P 27/06* (2013.01); *H02M 7/493* (2013.01); *H02P 29/60* (2016.02); *H02M 2001/0003* (2013.01); *H02M 2001/327* (2013.01)

(58) Field of Classification Search
CPC  H04N 5/37452; H04N 5/37455; H02P 27/06; H02P 29/60; H02M 7/493; H02M 2001/0003; H02M 2001/327
(Continued)

(56) References Cited
U.S. PATENT DOCUMENTS 5,191,518 A * 3/1993 Recker .................. H02J 3/46
                                                          363/41
9,257,934 B2 * 2/2016 Hamada ................ H02P 27/085
(Continued)

FOREIGN PATENT DOCUMENTS
EP          0524398       1/1993
EP          2211454       7/2010
(Continued)

*Primary Examiner* — Eduardo Colon Santana
*Assistant Examiner* — Devon Joseph
(74) *Attorney, Agent, or Firm* — Harness, Dickey & Pierce, P.L.C.

(57) ABSTRACT

Embodiments of the present invention relate to an a method, apparatus and computer program product for controlling the operation of a drive unit comprising a plurality of switching modules arranged to receive a DC electricity supply and generate an AC electricity supply for driving a load from the received DC electricity supply, the AC electricity supply being generated by the switching of the plurality of switching modules between a conducting state and a non-conducting state. The method comprises receiving one or more characteristics associated with each of the switching modules, comparing, for each switching module of the plurality of switching modules, a characteristic of the switching module with an equivalent characteristic associated with one or more other switching modules of the plurality of switching modules, and controlling a time period during which one or more of the plurality of switching modules are in the conducting state in accordance with a result of the comparison.

20 Claims, 8 Drawing Sheets (51) Int. Cl.
*H03K 5/00* (2006.01)
*H02M 7/493* (2007.01)
*H02M 1/00* (2006.01)
*H02M 1/32* (2007.01)

(58) Field of Classification Search
USPC .................... 327/365, 482; 363/55; 318/722
See application file for complete search history.

(56) References Cited

U.S. PATENT DOCUMENTS

| | | | | |
|---|---|---|---|---|
| 2002/0180518 | A1* | 12/2002 | Midya | H05K 1/025 327/564 |
| 2005/0047182 | A1* | 3/2005 | Kraus | H02M 7/493 363/71 |
| 2005/0057228 | A1* | 3/2005 | Shih | H02M 1/38 323/222 |
| 2007/0147097 | A1* | 6/2007 | Huang | 363/55 |
| 2010/0188135 | A1* | 7/2010 | Keronen | H02M 7/493 327/482 |
| 2013/0300491 | A1* | 11/2013 | Boe et al. | 327/365 |
| 2014/0204643 | A1* | 7/2014 | Wagoner | H02M 7/5387 363/132 |
| 2014/0333230 | A1* | 11/2014 | Panseri | H02P 27/06 318/3 |

FOREIGN PATENT DOCUMENTS

| | | |
|---|---|---|
| GB | 2295508 | 5/1996 |
| JP | 04033573 | 2/1992 |
| JP | 11285259 | 10/1999 |

* cited by examiner

CONTROL SYSTEM AND METHOD

CROSS-REFERENCE TO RELATED APPLICATION

This application claims the benefit and priority of Great Britain Patent Application No. 1213526.5 filed Jul. 27, 2012. The entire disclosure of the above application is incorporated herein by reference.

FIELD OF INVENTION

Embodiments of the invention relate to a system and method for controlling a drive unit which is arranged to produce an electricity source for driving a load such as a motor. More specifically, but not exclusively, the system and method enable for control of the operation of a plurality of switching modules of a drive unit in order to minimise strain on individual switching modules.

BACKGROUND TO THE INVENTION

Electric motors are commonly used in various high power applications such as driving pumps, crane hoists and elevators. Such electric motors are driven by drive units, which change an input supply to a voltage and frequency required for driving the operation of the motor. Such drive units either have an AC or DC input for driving an AC motor. For DC-AC drive units the drive units have an inverter which converts the DC voltage to an AC voltage and frequency. For AC-AC drive units the drive units have a rectifier that converts the AC input voltage to a DC voltage, the DC voltage is then converted to an AC voltage using an inverter.

In both DC-AC drive units and AC-AC drive units the inverter can be controlled to vary the voltage and frequency characteristics of the output electricity supply used to drive the motor. It is common for each inverter to include a number of switch components, such as insulated gate bipolar transistors (IGBTs), for switching the DC voltage in such a way that produces an AC voltage for driving the motor.

In order to achieve high output powers for driving high power motors it is common to utilise multiple stacks connected in parallel. That is the drive unit may comprise multiple sets of parallel inverters each having a number of IGBTs. Such an arrangement is provided to accurately match the motor power requirements while reducing the power ratings of components within the drive unit.

In order to increase the life of individual inverters, there is a common desire to balance the current flow across each IGBT in a similar position in the topology between the individual stacks. It is common for current balancing methods to provide a correction every pulse width modulation (PWM) switching period. These methods typically act on each PWM switching period in turn and have no memory of any prior control action. These methods are commonly known as "per switching period" methods. Such methods can provide current balance at higher current flows but do not generally perform well at low current as the system gains and control action limits employed have to be low due to stability issues. These issues stem from the frequency at which the currents must be measured and hence are susceptible to noise and measurement errors.

One outcome of these "per switching period" methods is a large imbalance during periods of low current demand which results in one of the stacks supplying most of the power while the other stack(s) supply very little. In consequence, there is a difference in temperature and stress between the individual stacks. This often leads to premature faults in the hottest stack when the current demand increases, even though the majority of individual stacks are still below the fault, or trip, temperature.

Even when the current delivered to the output by each IGBT is well-balanced some IGBTs can degrade faster than others within the same drive unit due to differing thermal conditions, due to, for example, different cooling provisions. Even if all of the individual stacks are installed in the same cubical there may exist different temperatures, or hot spots, within the cubical. As such, even when the output currents are balanced there may still be differences between the stress imposed on other components within, or external to, the stacks, such as the inductive chokes.

Consequently, simply balancing the current flow through each IGBT is not necessarily a complete solution to increasing the life span and reliability of motor drive units.

SUMMARY OF INVENTION

Embodiments of the present invention attempt to mitigate at least some of the above-mentioned problems.

In accordance with a first aspect of the invention there is provided a method for controlling the operation of a drive unit comprising a plurality of switching modules. The plurality of switching modules are arranged to receive a DC electricity supply and generate an AC electricity supply for driving a load from the received DC electricity supply. The AC electricity supply is generated by switching of the plurality of switching modules between a conducting state and a non-conducting state. The method comprises receiving one or more characteristics associated with each of the switching modules, comparing, for each switching module of the plurality of switching modules, a characteristic of the switching module with an equivalent characteristic associated with one or more other switching modules of the plurality of switching modules, and controlling a time period during which one or more of the plurality of switching modules are in the conducting state in accordance with a result of the comparison.

Controlling the time period during which one or more of the plurality of switching modules are in the conducting state may comprise shortening the time for which a respective switching module is in the conducting state in accordance with the result of the comparison.

The time period during which a respective switching module is in the conducting state may be shortened by delaying the switch-on time of the switching module in accordance with the result of the comparison.

The step of comparing may further comprise, for each switching module of the plurality of switching modules, comparing the characteristic of the switching module with an average of the equivalent characteristic associated with each switching module of the plurality of switching modules.

The step of controlling the time period during which one or more of the plurality of switching modules are in the conducting state may comprise shortening the time period during which a respective switching module is in the conducting state when the characteristic of the respective switching module is greater than the average of that characteristic for each switching module of the plurality of switching modules.

One of the one or more characteristics may be a temperature associated with a respective switching module.

One of the one or more characteristics may be an electric current associated with a respective switching module.

One of the one or more characteristics may be an accumulated electric current associated with a respective switching module.

One of the one or more characteristics may be indicative of a strain placed on a respective switching module.

One of the one or more characteristics may be determined by measuring the characteristic.

One of the one or more characteristics may be determined by modelling the characteristic.

The time period during which one or more of the plurality of switching modules are in the conducting state may be controlled by a control signal for operating the switching of a respective switching module.

In accordance with a second aspect of the invention there is provided apparatus for controlling the operation of a drive unit comprising a plurality of switching modules arranged to receive a DC electricity supply and generate an AC electricity supply for driving a load from the received DC electricity supply. The AC electricity supply is generated by switching of the plurality of switching modules between a conducting state and a non-conducting state. The apparatus comprises a processor arranged to receive one or more characteristics associated with each of the switching modules, compare, for each switching module of the plurality of switching modules, a characteristic of the switching module with an equivalent characteristic associated with one or more other switching modules of the plurality of switching modules, and control a time period during which one or more of the plurality of switching modules are in the conducting state in accordance with a result of the comparison.

In accordance with a third aspect of the invention there is provided a drive unit for providing an AC electricity source for driving a load. The drive unit comprises an input arranged to receive a DC electricity source, an output arranged to produce an AC electricity source for driving a load, a plurality of switching modules arranged between the input and the output, the plurality of switching modules arranged to receive the DC electricity supply and generate an AC electricity supply for driving the load from the received DC electricity supply, the AC electricity supply being generated by the switching of the plurality of switching modules between a conducting state and a non-conducting state, wherein the plurality of switching modules are controlled by a respective control signal, and the apparatus as disclosed above.

A plurality of groups of the plurality of switching modules may be provided. Each group of the plurality of switching modules may have an associated apparatus as disclosed above. Furthermore, each apparatus associated with each group of the plurality of switching modules may be communicatively coupled.

In accordance with a fourth aspect of the invention there is provided a computer readable medium comprising computer readable code operable, in use, to instruct a computer to perform the method as disclosed herein.

Embodiments of the invention provide a method for controlling the balance or correction of turn-on time instances of switch components within parallel connected inverter modules when the inverter modules are supplying a common load.

In embodiments of the invention, the turn-on time instances of the switch components are controlled in order to provide a specified balance condition for one or more of the following: output current per period cycle, internal or external temperature, specific switch component de-rating, and stress management of connected components including chokes based on accumulated factors such as the square of the current multiplied by the time.

Embodiments of the invention provide a long term offset which is introduced in parallel with the "per switching period" method correction, should any exist, to provide long term balance control. The "per switching period" method correction may have low gain due to stability issues and may have no memory. The "per switching period" method correction may therefore simply act upon the current balance as measured during the rising edge of the gate signal.

Unlike limited short term (<100 us) current balancing that is generally provided on a "per switching period" manner, which due to stability issues operate at effectively low currents, have limits regarding maximum effect and also do not take account of other longer term effects (e.g. thermal), embodiments of the invention provide a method of adjusting the average correction or balance based on long term factors such as difference in temperature and average current between inverter modules.

Embodiments of the invention offer protection against problems with dissimilar ventilation. In particular, embodiments of the invention provide balancing at lower powers where currently a single inverter module could run at high power while the other inverter modules are running at zero current and hence create a difference in temperature between the inverter modules that can cause premature tripping, especially if the combined required output power increases.

Some embodiments of the present invention provide one or more of the following advantages: protect against problems with dissimilar ventilation between power inverter modules using thermal balancing; balance currents at lower powers which can prevent an inverter module prematurely tripping; increase system stability due to reduction in "per switching period" correction gain for same long term balancing; enable for real-time diagnostics; and allow for "per switching period" correction.

Embodiments of the invention provide separation of control demands into per switching component, per module output phase and per inverter module groups.

Some embodiments of the invention include selecting an appropriate time constant for each control action associated with each control demand.

For certain embodiments of the invention the control outputs from each of the control demand type groups are summed and subjected to the different time constants to produce a per local switch component control output.

Embodiments of the invention de-rate components for current and temperature, which is advantageous because of differing cooling arrangements and thermal time constants.

In embodiments of the invention, the balance between the locally measured or modelled temperature of each of the switching components connected in a similar location within each of the inverter modules is controlled given the average temperature and subject to any specified de-rating of a local switch component.

In embodiments of the invention, the local output current per phase per period is accumulated based on the point at which the current changes polarity using a simple phase locked loop. The combined output current per phase per period may also be determined. Each module may control the local output current per phase per period based on the combined value subject to any specified de-rating of a local output phase.

Embodiments of the invention provide a control action which aims to balance a local index and an average index subject to any local de-rating. The index relating to the stress level of local external components, such as the square of the current multiplied by the time, and the average of the combined inverter modules, may be known. The inverter module local external temperature and the average of the combined inverter modules external temperate may also be known. The control action may balance the local and average external temperatures subject to any local external temperature de-rating.

BRIEF DESCRIPTION OF THE DRAWINGS

Exemplary embodiments of the invention shall now be described with reference to the drawings in which.

Throughout the description and the drawings, like reference numerals refer to like parts.

SPECIFIC DESCRIPTION

Figure 1:
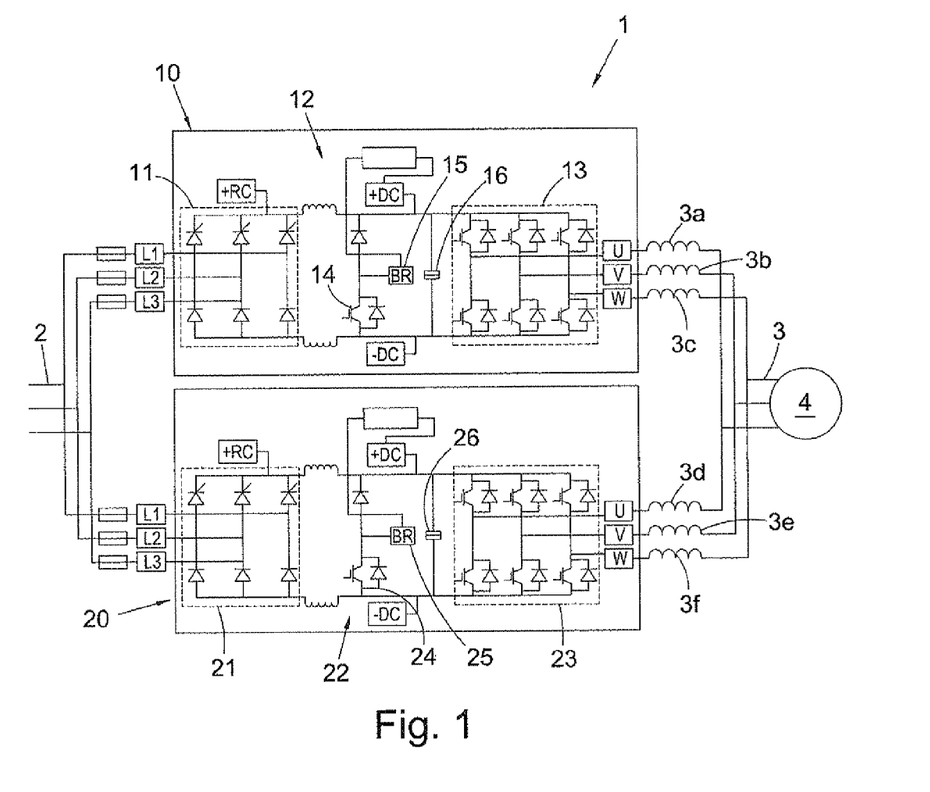
FIG. 1 shows a drive unit comprising multiple stacks.

FIG. 1 shows a drive unit 1 for providing a variable power to a motor 4. The drive unit 1 is in the form of a power stack arrangement comprising a first stack 10 and a second stack 20. Each stack 10, 20 is provided with a plurality of switch components so as to deliver the required voltages to the motor 4 amongst a greater number of components.

Each stack 10, 20 comprises a rectifier 11, 21, a DC link filtering stage 12, 22 and an inverter 13, 23. The drive 1 is arranged to receive a three-phase AC input voltage from a supply cable 2, and produce a three-phase AC output voltage for transmission along a motor cable 3. The motor cable 3 is connected at its other end to a motor 4. The drive 1 is arranged to control the motor 4 by varying characteristics of the power delivered to the motor 4.

The rectifier 11, 21 comprises an arrangement of a plurality of rectifying components and receives the AC input voltage from the supply cable 2. These rectifying components may take the form of diodes or controlled thyristors or a mixture of both. The input voltage is three-phase and has a fixed voltage and frequency. The filtering stage 12, 22 comprises DC inductors in series with the positive and negative voltage outputs of the rectifier and a DC bus capacitor network 16, 26.

The DC inductor arrangement provides the individual rectifiers with an impedance. Without this impedance it would be possible for the rectifier of one of the stacks to provide all of the rectification and thus experience the entire power flow.

The DC bus capacitor network 16, 26 is configured to filter the output of the rectifier 11, 21 and is configured to enable the inverter 13, 23 to control the output power factor. Together, the rectifier 11, 21 and the filtering stage 12, 22 convert the AC input voltage into a DC voltage.

The DC voltage produced by the rectifier 11, 21 and filtering stage 12, 22 is subsequently received by the inverter 13, 23. The inverter 13, 23 comprises a plurality of IGBTs, each having an associated anti-parallel freewheeling diode that is arranged to conduct the inductive output current when the IGBT is off, i.e. not conducting. The inverter 13, 23 is configured to convert the DC voltage it receives into a three-phase AC output voltage that is of variable voltage and variable frequency. This may be through simple PWM techniques or space vector modulation (SVM) techniques.

The three-phase AC output voltage is then transmitted through a plurality of separate output chokes 3a-3f, which accommodate the differences in IGBT activation times between units, and then along the motor cable 3 to control the motor 4. The voltage and frequency are made variable by pulse-width modulation, involving rapid switching on and off of the IGBTs in the inverter 13, 23.

During normal operation the drive unit is arranged so that power can flow to and from the motor 4. When power flows from the motor 4, the DC bus voltage rises due to the rectifying action of the IGBT's anti-parallel diodes. Braking resistor connections 15, 25, are therefore provided so that external braking resistors can be selectively activated to permit current flow from the DC bus (between −DC and +DC) to be dissipated by the external braking resistors to limit the rising DC bus voltage. When activated, the braking resistor connections 15, 25 therefore limit the flow of current through the rectifier so that current is only flowing from the supply to the DC bus. The action of activating the external braking resistors therefore reduces the DC bus voltage.

In FIG. 1, the braking resistor connections 15, 25 of each stack are separate so as to enable each stack to monitor and protect its own local external brake resistor. The AC supply to each stack must therefore be individually fused.

The switching of the IGBTs is controlled by a control system (not shown in FIG. 1), which is a microprocessor or a number of communicatively coupled processors arranged to output switching signals to each of the IGBTs. The control system determines when each of the IGBTs need to be conducting in order to provide an AC output voltage with the voltage and frequency characteristics required by the motor 4. The control system is also arranged to vary the switching of each of the IGBTs in order to compensate for certain characteristics associated with individual IGBTs to thereby improve performance and increase the life of the drive unit 1. This is achieved by monitoring and/or modelling characteristics that place a strain on components, such as a current and/or temperature associated with a component. A strain is effectively a long term stress placed on a component, such as long term high current or high temperature. The compensation functionality can achieve this, for example, by monitoring the current and temperature at each IGBT and comparing the current and temperature at each IGBT with the average current and temperature at all IGBTs. For those IGBTs that are either carrying a larger current or are hotter than the average temperature for all IGBTs within the drive unit, the control system can delay a switch-on time for those IGBTs under strain so that such IGBTs have current flowing through them for a shorter time period, which thereby reduces the strain on that component. The corresponding IGBTs in the other stacks will thus provide a larger proportion of the required output current. The operation of this compensation functionality shall now be described in detail with reference to FIGS. 2 and 3.

Figure 2:
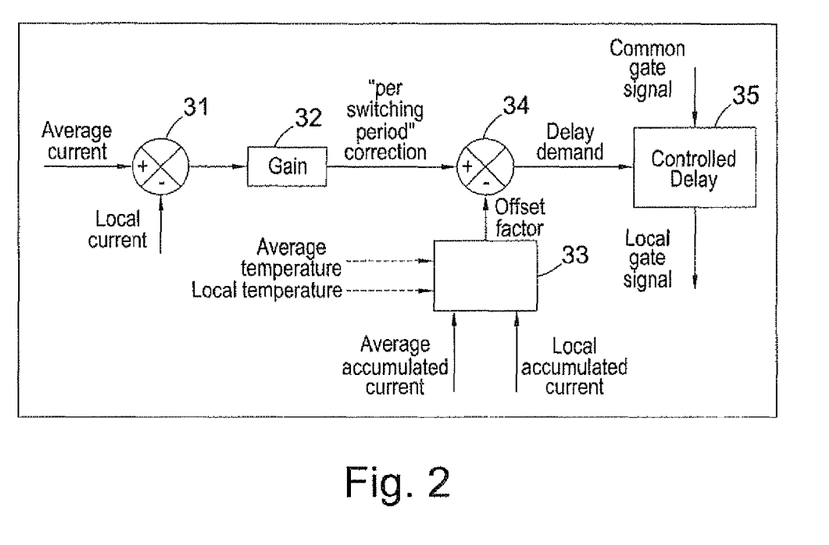
FIG. 2 shows the process for applying a delay to the switch-on time of the IGBTs of FIG. 1.

FIG. 2 shows the process of controlling the IGBT switching to compensate for strain on individual IGBTs due to factors such as excess current and temperature. The process of FIG. 2 is therefore used for determining a switch-on timing delay for an individual IGBT to reduce a conduction time, and therefore a strain, for the individual IGBT. The same process is applied for each IGBT individually. In FIG. 2, the "per switching cycle" correction is applied along with the strain or offset factor correction.

The "per switching cycle" correction is determined as follows. A local current at each IGBT is measured using a shunt resistor or a DC current transformer (DCCT) associated with each IGBT. An average current is then determined from each of the local currents associated with each IGBT. A summing block 31 then generates an error signal from the local current and the average current by determining the difference between the local current and the average current. The error is then amplified by a gain module 32 to produce the "per switching period" correction. The gain module 32 is required in order to tune the overall system to provide the required closed loop performance.

In summing block 34, the "per switching period" correction is summed with an offset factor to produce a delay demand. The offset factor is produced at offset factor determination block 33. While the "per switching cycle" correction corrects for problems occurring in each individual switching cycle, the offset factor is arranged to correct switching timing to compensate for long term strains placed on components. For example, the offset factor provides an indication of the current strain on the particular IGBT; such an indication being derived from various factors such local and average temperatures and local and average accumulated current. The generation of the offset factor is discussed in detail with reference to FIG. 3.

The delay demand produced by summing block 34 is indicative of an amount by which the switch-on time of a particular IGBT needs to be delayed in order to compensate for strain determined at the offset determination block 33 and for the "per switching period" correction. The delaying action is implemented in the controlled delay block 35, which receives a common gate signal for a particular IGBT and delays the switch-on time of that gate signal in accordance with the received delay demand to provide a delayed local gate signal. The delay to the first edge of the turn-on pulse is proportional to the delay demand input into the controlled delay block 35.

Figure 3:
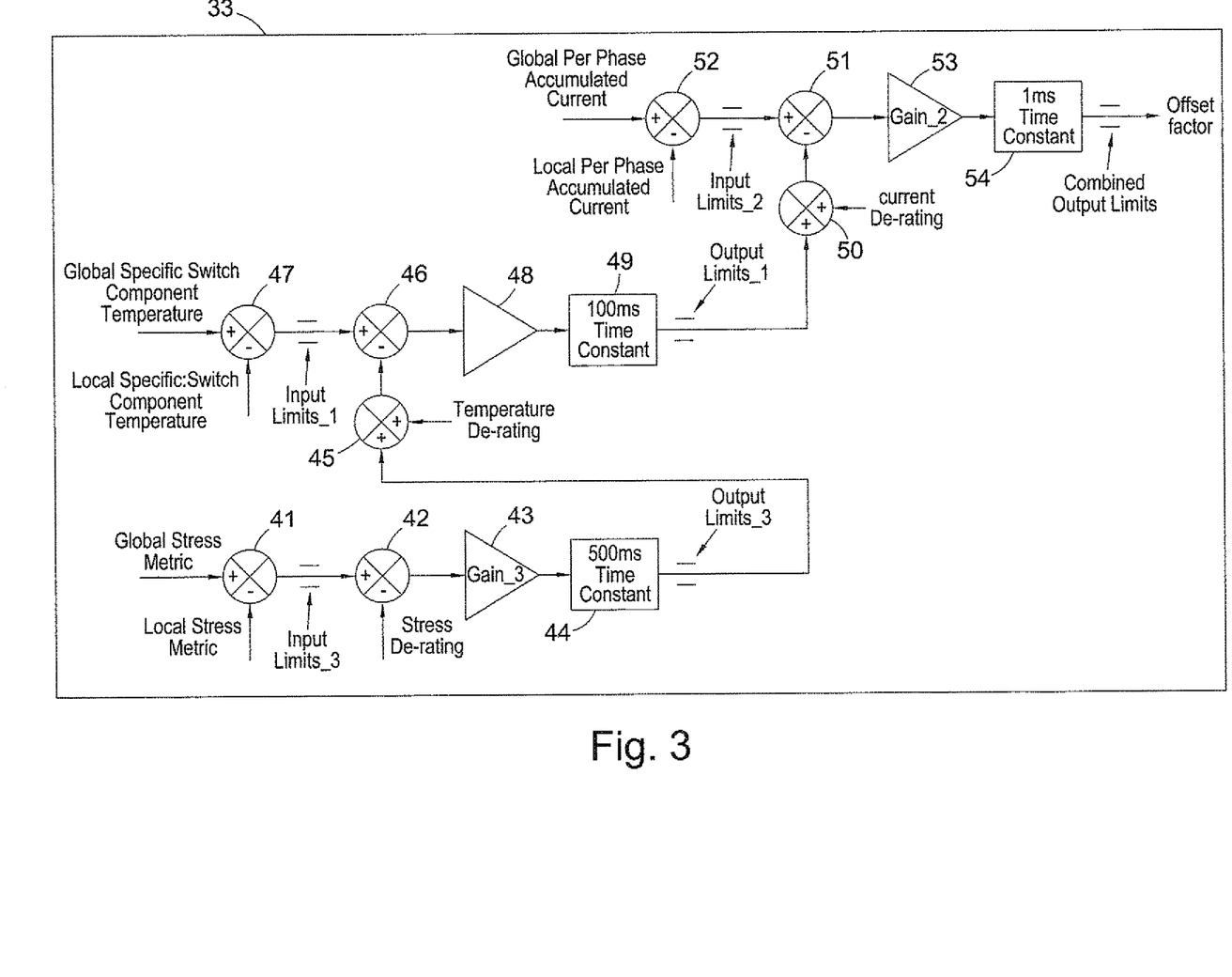
FIG. 3 shows the process for the determining the offset factor of FIG. 2.

FIG. 3 provides a detailed schematic flow of the functionality of the offset factor determination block 33. Such an offset factor determination procedure is provided for each IGBT.

Firstly, the affects of stress on a component of groups of components is determined. Such stress is primarily the prolonged exposure of electrical components to both current and/or voltage, this may include a rate of change of current or voltage. Such stress is generally a long term effect, for example something that takes place over a number of seconds. Stress is also caused by certain thermal conditions. Thermal stress starts occurring when components are subjected to excess heat for just less than a second or more.

In order to determine the affects of strain or stress on a component, a local stress metric is determined for each individual stack or component within a stack and is obtained by use of a stress model. The stress model uses local values for current, voltage and frequency to determine the stress on the power components including the chokes, rectifiers and DC bus capacitors. The simplest form of such a model is to sum the square of the current with time. The model may be of an individual IGBT or another component within the stack, for example the DC inductors, or even the entire stack. However, while the model may relate to components other than an IGBT, the stress is managed by controlling the IGBTs. Furthermore, the stress on all IGBTs in a stack could form the basis of the model or the stress on a single IGBT within the stack could form the basis of the model. In such a case, both the local and global stress models would depend on only the current through that single IGBT. Hence, six sets of different stress inputs would be required.

From each of the local stress metrics, a global stress metric, which is an average of all of the local stress metrics and can be determined by the individual stacks and obtained via an analogue signal level or through data communications. When implemented, each stack has a processor to perform this processing and each processor of each stack is connected to each other via a serial communication link to share information. As such, data can be transferred directly between such processors.

The global stress metric is then summed with the local stress metric for the IGBT for which this processing applies in comparator block 41. The comparator block 41 then produces a stress error for the IGBT, which is the difference between the global value and the local value. When attempting to balance the stress of individual IGBTs, then the stress error is the difference between the stress of the local component and the average for that component across all of the drives—i.e. the relative stress. If the stress error is the stress of the rectifier, then the stress error will be equal for all of the six IGBTs.

The resulting stress error determined by the comparator block 41 is then limited to provide boundaries to the extent to which the stress management system can affect the final current balancing of the IGBTs. These limits help to prevent one of the corrections to outweigh the effect of other corrections. The limited output is then summed with a stress de-rating value in block 42. The stress de-rating value enables for the amount of relative stress of the local stack, or local IGBT, to be de-rated (or offset). It is not uncommon for different stacks to have slightly different components, for example different rectifiers, DC inductors or DC capacitors. Hence, the individual stress de-rating allows for these differences to be taken into consideration in this process. The stress de-rating value is used to control the balance point between stacks. The value for the stress de-rating could represent a difference in choke power rating between drives, for example. The limited and de-rated stress error is then amplified by a system gain in gain block 43 to tune or normalise the system dynamics.

The output of the gain block 43 is then filtered by filter 44 in order to control the dynamic behaviour of the control action. The characteristics of the filter are selected specifically to the rate required for the final offset output. Filter 44 has a time constant of 500 ms. This time constant has been selected based on the expected change of the input signals and the speed at which they need to be controlled. The current requires 1 ms as a 50 Hz output has 10 ms per half period. The thermal compensation needs to be slower than this for modulation reasons and changes in about a second so needs to be faster than a second. The stress will also change in seconds so 500 ms provides optimum performance. While the time constant value may be altered, ideal operation of the system will only be provided if the time constant is greater than approximately four times that of the filter in block 49. The output of the filter is then subjected to a stress output limit which again permits the affect of the stress management system to be restricted.

The output from the limiter is therefore the output from the stress metric compensation process. This output is indicative of an amount of compensation of the IGBTs turn-on time is required to compensate for the stress that the IGBT is under.

This output is then combined at summation block 45 with a temperature de-rating. The temperature de-rating is provided due to different heating or cooling configurations and corresponding differing thermal time constants and heat extraction. As such, incorporation of the temperature de-rating allows for hot spots on the drive, furthest away from the extractor fans for example, to be avoided.

The temperature de-rated stress metric correction is then combined, at block 46, with a switch component temperature correction. The switch component temperature correction process is described below.

The switch component temperature correction process comprises comparing the difference between a global specific switch component (IGBT) temperature with a local specific switch component (IGBT) temperature at block 47. The local specific switch component temperature is the temperature local to a specific switching component and is determined by a local temperature measurement. The global specific switch component temperature is the average of all of the local specific switch component temperatures that have been determined by the individual stacks and is obtained via an analogue signal level or through data communications. Hence, the temperature error is indicative of a difference in temperature at a specific switching component compared to all other switching components.

The difference between the global and local switch component temperature is then limited before being combined with the temperature de-rated stress metric correction at block 46.

The output of block 46 is then subjected to a gain at gain block 48 and filtered by filter 49 having a time constant of 100 ms. The time constant value may be altered, however, optimum operation of the system is provided if the time constant is greater than twenty times that of the filter in filtering block 54. The filtered output is then limited and subsequently summed at comparator block 50 with a current de-rating value. The current de-rating value may be provided so that if there are smaller or older IGBTs in one of the stacks the current through such IGBTs can be de-rated. The output of comparator block 50 is then inputted into block 51, wherein it is combined with the per phase accumulated current correction, which is discussed below.

The "per phase accumulated current" error is determined by comparing a global "per phase accumulated current" and a local "per phase accumulated current", associated with the switching component for which this processing applies, in block 52. The local "per phase accumulated current" is the total current delivered to the load by the IGBT for which this processing is being carried out when the IGBT is conducting. The global "per phase accumulated current" is the average of all the local "per phase accumulated currents" that have been determined by the individual stacks and is obtained via an analogue signal level or through data communications.

The output of comparator block 52 is then limited to place boundaries on the affect of the error on the balancing system. The limited per phase accumulated current correction is then summed with the current de-rated combined component temperature and stress metric correction in block 51. The output of block 51 is then subjected to a gain at block 53 and is then filtered with a 1 ms time constant in block 54 before being limited. It is the output of the limiter which then enters the summation block 45 to be combined with the stress metric correction. The final output of the offset factor determination block 33, i.e. the offset factor, is therefore the combination of the stress metric correction, the per phase accumulated current correction and the component temperature correction.

The use of the time constant filters 44, 49 and 54 permits for control actions with different time constants to be combined. The use of de-rating values permits control of the final balance of correction parameters. The use of limits provides control of the affects of the individual control actions; stress management, temperature compensation and phase current balance. For example, the accumulated current correction requires a rapid and yet small delay. Hence, use of such limits equalises the effect of the different control actions such as stress management, thermal compensation and accumulated current balance. The temperature compensation requires a larger delay and hence gain, but to remain stable must be filtered by a 100 ms time constant filter. As such, the use of the different filters, gains and limits permits the system to combine both the thermal and the current control actions into a single control output. For example, a simple way of viewing this would be the superposition of multiple carriers.

The structure of the system for controlling the drive unit 1 shall now be described in more detail with reference to FIGS. 4 and 5.

Figure 4:
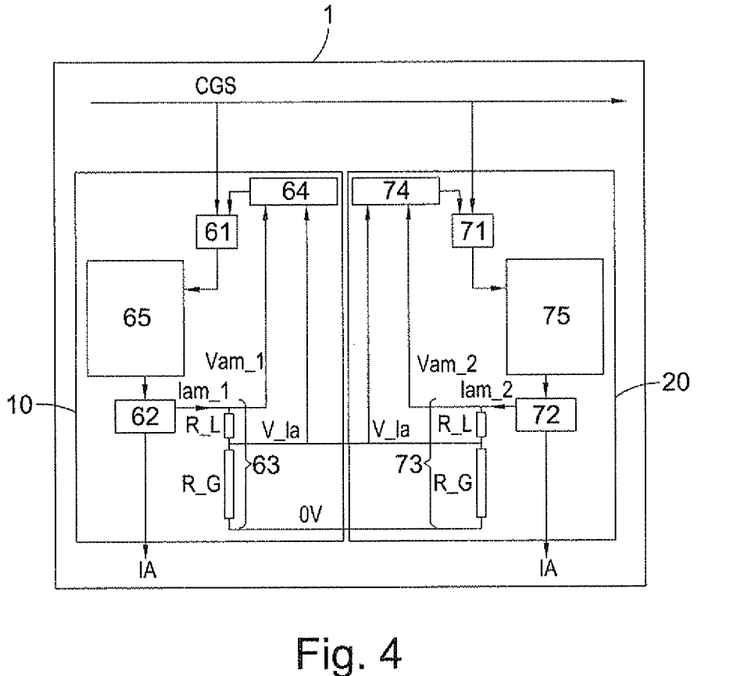
FIG. 4 schematically shows the control system for the drive unit of FIG. 1.

FIG. 4 illustrates an implementation of the generation of the local (Iam_1 and Iam_2) and global (Ia) current measurement signals in the drive unit 1. Common gate signals are produced by a microprocessor and received by every stack of the drive unit. A common gate signal is provided for each IGBT (shown as block 65, 75); in this case six common gate signals are provided, one for each IGBT in the stack. In FIG. 4, the common gate signal, CGS, for one of the IGBTs is modified in the delay circuit blocks 61, 71. The delay circuit blocks 61, 71 perform the functionality of the controlled delay of FIG. 2 and may be implemented by a processor. Consequently, a modified gate signal or the local gate signal is produced for each individual IGBT from each individual common gate signal.

Each stack has a DCCT 62, 72 which is used to measure the resulting current flowing from each phase output (only one phase, phase A, is shown in the Figure). It is only necessary to measure per output phase current. In FIG. 1 it can be seen that there are two IGBTs connected to each output phase, one connected to the positive DC bus line and one to the negative. Due to the anti-parallel diodes within each IGBT, the positive connected IGBT carries all of the current during the positive half-cycle of the output current measurement and the negative connected IGBT conducts during the negative half-cycle. Thus, the measurement of the phase current can be split into the current carried by each of the two IGBTs.

The output of each DCCT associated with each stack is the local current Iam_1 and Iam_2. These local currents are then input into a potential divider network 63, 73 of each stack 60, 70 to convert the current into a voltage. A voltage proportional to the global phase A output phase current measurement, V_Ia, is determined using the potential divider circuit as also defined by equation 1:

$$V_{Ia} = R_G * \frac{(I_{am_1} + I_{am_2})}{2} \quad \text{(Equation 1)}$$

The voltages proportional to the local A phase currents are defined by equations 2 and 3

$$V_{am_1} = V_{Ia} + [R_L * I_{am_1}]$$ Equation 2

$$V_{am_2} = V_{Ia} + [R_L * I_{am_2}]$$ Equation 3

The voltages proportional to the local output phase current and the global output phase currents are the inputs to the delay correction units 64, 74. Each stack has its own associated delay correction unit for performing the "per switching period" offset factor delay correction discussed with respect to FIGS. 2 and 3 individually. The delay correction units may each be individual processors associated with a stack. The functionality of each delay circuit block and delay correction unit may be integrated within a single processor. The outputs of the delay correction units 64, 74 is the delay demand which is implemented in the delay circuits 61, 71, which is then used to control the IGBTs in the respective inverters. Hence, delay correction units 64, 74 perform the functionality of processing blocks 31, 32, 33 and 34 of FIG. 2, while the delay circuits 61, 71 perform the functionality of the controlled delay of FIG. 2. delay function of 35. The output of the delay circuits is therefore the delayed control signals for switching the IGBTs.

Figure 5:
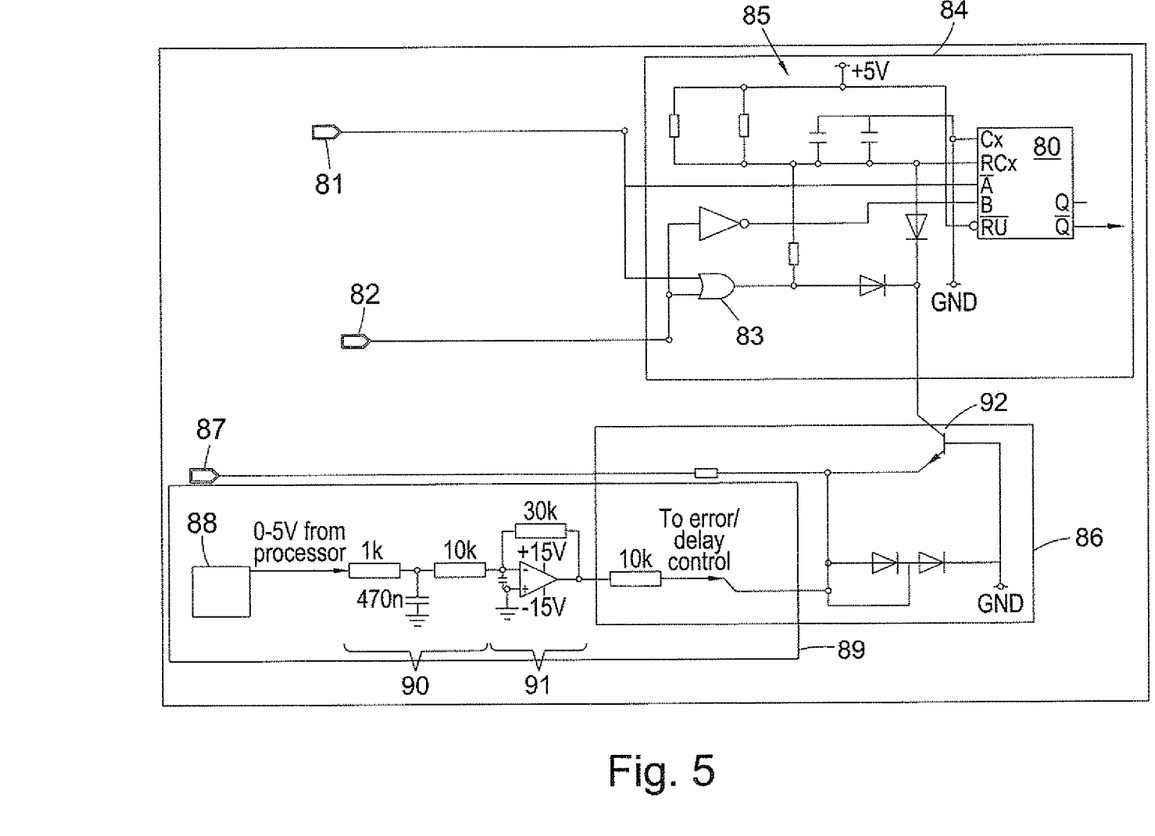
FIG. 5 shows a control output stage associated with each IGBT of FIG. 1.

FIG. 5 illustrates a control output stage for each IGBT of the drive unit 1. In particular, FIG. 5 illustrates how the delay is applied to the control signal to vary the conduction time of each IGBT.

The application of the delay to the switch-on time of each IGBT is determined by a delay generation circuit 84 associated with the particular IGBT. The delay generation circuit 84 uses a 74_123 "Dual retriggerable monostable multivibrator with reset" integrated circuit 80. A timer circuit within the integrated circuit 80 is controlled by a charge circuit 85, the discharge of which is dependent on the current drained through the transistor 92 in a delay summation circuit 86.

The delay summation circuit 86 receives the "per switching period" correction at a "per switching period" correction input 87 and the offset factor at the offset factor input 88. The offset factor then passes through a delay correction output circuit 89, which consists of an RC filter 90 to reduce noise and a buffer 91 in the form of an op-amp which also provides signal level shifting and inverting. The delay summation circuit 86 then combines the "per switching period" correction and the processed offset factor to produce the delay demand. The combined delay demand is then utilised to control the current flowing through transistor 92, which in turn affects the discharge of the discharge circuit and then affects the timing of the local gate signal for switching the respective IGBT. Hence, this is how the corrections control to the switch-on time of an IGBT.

Further functionality is provided to control the on-time of an IGBT in order to prevent switching problems arriving. In particular, two IGBT gate control signals associated with an IGBT connected to the positive DC bus and an IGBT connected to the negative DC bus 81, 82 associated with the first and second stacks are combined using an OR logic gate 83 to produce a pulse synchronised to a deadtime between the upper and lower IGBTs. The deadtime is a period of inactivity inserted between turn-on periods of the IGBTs associated with the first and second stacks connected to the same phase output. This functionality protects against both the IGBTs associated with the first stack and the IGBTs associated with the second stack being on at the same time which would lead to a short circuit across the DC bus. Each IGBT is subject to different turn-on and turn-off delays due to the separate gate control circuits. If an IGBT turns on faster than the other turns off, the DC bus would experience a short circuit, commonly known as a "shoot-through". Hence, the deadtime, or "interlock period" as it is otherwise known, protects against this. The activation edge delay of the turn-on pulse for an IGBT is therefore based on the end of the deadtime between the turn-on pulses of the IGBTs associated with the first stack and the IGBTs associated with the second stack FIGS. 6 to 12 illustrate the affect of the offset correction on the "per switching period" correction, as discussed in detail below.

Figure 6:
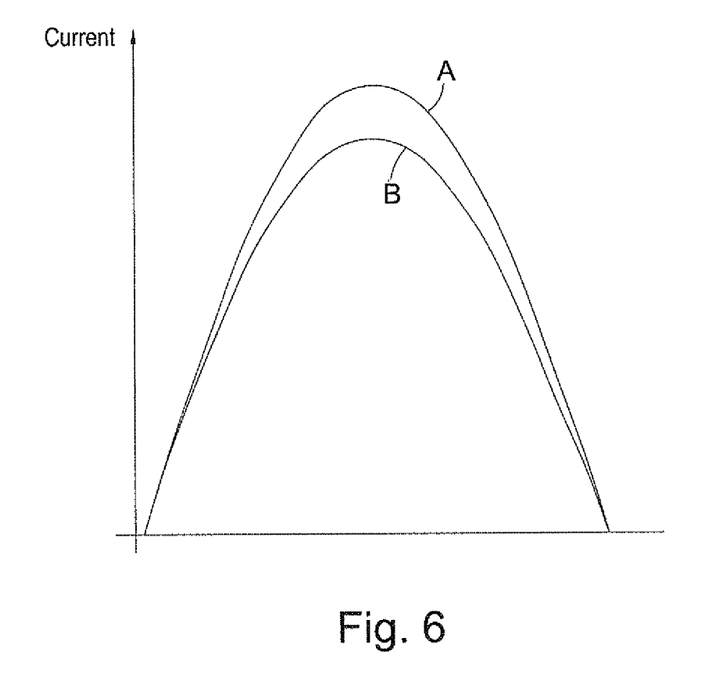
FIG. 6 shows the change in current over time for two parallel stacks with no correction.

FIG. 6 shows the relationship between current and time for the first and second stacks 10, 20, shown as curves A and B respectively, when no correction is performed to improve the performance of the stacks. The imbalance between the stacks when there is no "per switching period" correction and no offset correction can be seen by the difference between the current delivered by the stacks. The imbalance may be due to different impedances between stacks and differing IGBT driver circuit delays. As can clearly be seen in FIG. 6, the imbalance is greatest at the peak.

Figure 7:
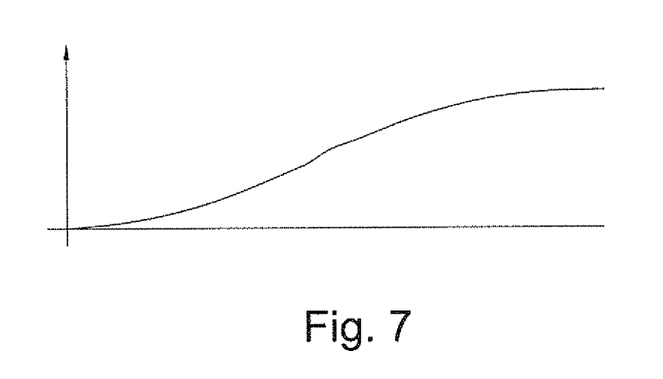
FIG. 7 shows the cumulated difference in current between the two parallel stacks of FIG. 6.

FIG. 7 shows the accumulated current error over time. It can be seen how the current imbalance builds up during the half output cycle when the IGBT is conducting (during periodic AC output generation, each IGBT conducts for one half output cycle).

Figure 8:
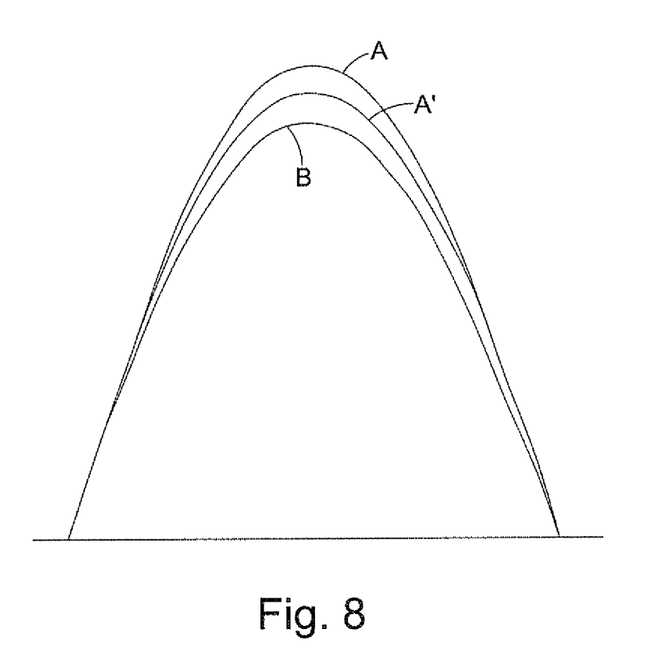
FIG. 8 shows the change in current over time for two parallel stacks with per switching period correction applied.

FIG. 8 provides a similar plot, but with "per switching period" correction applied to the first stack 10 shown by line A'. The "per switching period" correction reduces the imbalance at the peak of the current. But, the imbalance is not eliminated because of the low control action gain and limits are required to maintain system stability. As such, this correction has no affect during low currents.

Figure 9:
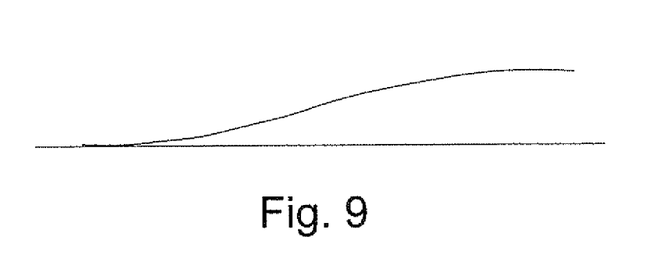
FIG. 9 shows the cumulated difference in current between the two parallel stacks of FIG. 8.

FIG. 9 shows the accumulated current error associated with FIG. 8. Therein, it can be seen the current imbalance is reduced but builds up significantly during the half output cycle.

Figure 10:
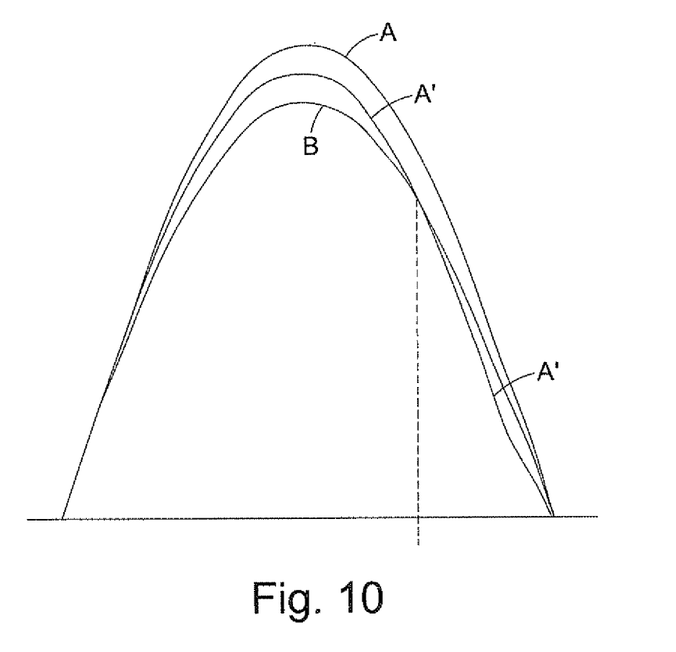
FIG. 10 shows the change in current over time for two parallel stacks with per switching period correction and delay factor correction applied.

FIG. 10 shows the affect of using the "per switching period" correction and the delay correction of embodiments of the invention. The imbalance at the peak is reduced but not completely eliminated. However, the imbalance at the beginning and end of the switching period is significantly reduced.

Figure 11:
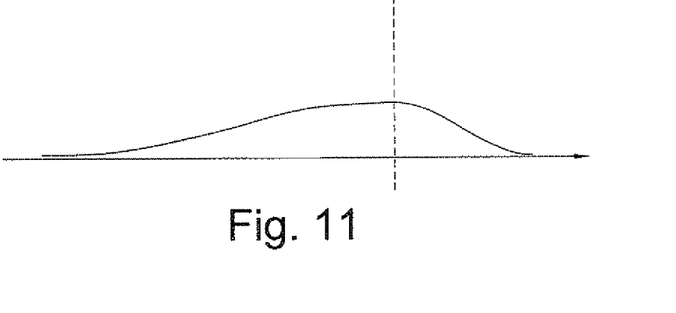
FIG. 11 shows the cumulated difference in current between the two parallel stacks of FIG. 10.

FIG. 11 shows the accumulated current error associated with FIG. 10, therein it can be seen that correction is carried out at low currents which reduces the rate at which the imbalance accumulates and then the correction continues after the peak of the half cycle in order to reduce the accumulated error yet further. In some cases the accumulated error will have been reduced to zero by the end of the output half cycle.

It will be appreciated that in alternative embodiments of the invention more than two stacks may be provided. In fact, the number of stacks and the number of switching components per stack is not always of importance in embodiments of the invention that relate to control of a plurality of switching components.

Furthermore, it will be appreciated that the switching components are not limited to IGBTs and any suitable switching components may be used.

While the above-described embodiment of the invention relates to an AC-AC power stack it will be appreciated that embodiments of the invention relate to DC-AC systems.

In alternative embodiments the DC bus on each stack is connected; connection is to the +DC and −DC terminals. In such an arrangement fuses are fitted to the DC link terminals. Since the DC links are connected, some impedance is provided to ensure current sharing in the rectifiers. Furthermore, the DC link chokes in both the plus and minus lines provide sharing impedance for the rectifiers.

In alternative embodiments other DC bus topologies are provided. For example, the DC bus of each individual drive may be connected in parallel through fuses. In a system where the DC bus of each individual drive is not connected, the action of switching the inverter IGBT's in parallel with the other drives inverter IGBTs makes the individual drives DC bus voltages tend to the same voltage level.

While the above description relates to variation of the switch-on time to shorten the conduction time and therefore strain on a switching component, it will be appreciated that the switch-off time could also be varied to shorten the conduction time of a switching component.

It will be appreciated that the various methods described above may be implemented by a computer program. The computer program may include computer code arranged to instruct a computer to perform the functions of one or more of the various methods described above. The computer program and/or the code for performing such methods may be provided to an apparatus, such as a computer, on a computer readable medium. The computer readable medium could be, for example, an electronic, magnetic, optical, electromagnetic, infrared, or semiconductor system, or a propagation medium for data transmission, for example for downloading the code over the Internet. Non-limiting examples of a physical computer readable medium include semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such computer code to perform one or more processes in accordance with the various methods discussed above.

The invention claimed is:

1. A method for controlling the operation of a drive unit comprising a plurality of switching modules arranged to receive a DC electricity supply and generate an AC electricity supply for driving a load from the received DC electricity supply, the AC electricity supply being generated by switching of the plurality of switching modules between a conducting state and a non-conducting state in accordance with a switching period, the method comprising:
receiving one or more characteristics associated with each of the switching modules;
generating, for each switching module of the plurality of switching modules, an error signal with a comparator that compares a characteristic of a respective switching module with an equivalent characteristic associated with one or more other switching modules of the plurality of switching modules; and
controlling a time period during which the respective switching module is in its conducting state in accordance with the generated error signal,
wherein controlling the time period includes applying a per switching period correction with a delay circuit to correct for problems occurring in each individual switching period and an offset factor to compensate for long-term strains placed on one or more of the switching modules, and wherein the offset factor is summed with the per switching period correction to produce a delay demand that is indicative of an amount by which a switch-on time of each switching module needs to be delayed.

2. The method according to claim 1, wherein controlling the time period comprises shortening the time for which the respective-switching module is in its conducting state in accordance with the generated error signal.

3. The method according to claim 2, wherein the time period during which the respective switching module is in its conducting state is shortened by delaying the switch-on time of the respective switching module with the delay circuit in accordance with the generated error signal.

4. The method according to claim 1, wherein generating comprises, for each switching module of the plurality of switching modules, comparing the characteristic of the respective switching module with an average of the equivalent characteristic associated with each switching module of the plurality of switching modules.

5. The method according to claim 4, wherein controlling the time period comprises shortening the time period during which the respective switching module is in its conducting state when the characteristic of the respective switching module is greater than the average of that characteristic for each switching module of the plurality of switching modules.

6. The method according to claim 1, wherein one of the one or more characteristics is a temperature associated with the respective switching module.

7. The method according to claim 1, wherein one of the one or more characteristics is an electric current associated with the respective switching module.

8. The method according to claim 1, wherein one of the one or more characteristics is an accumulated electric current associated with the respective switching module.

9. The method according to claim 1, wherein one of the one or more characteristics is indicative of a strain placed on the respective switching module.

10. The method according to claim 1, wherein one of the one or more characteristics is determined by measuring the characteristic.

11. The method according to claim 1, wherein one of the one or more characteristics is determined by modelling the characteristic.

12. The method according to claim 1, wherein the time period during which the respective switching module is in its conducting state is controlled by a control signal for operating the switching of the respective switching module.

13. An apparatus for controlling the operation of a drive unit comprising a plurality of switching modules arranged to receive a DC electricity supply and generate an AC electricity supply for driving a load from the received DC electricity supply, the AC electricity supply being generated by switching of the plurality of switching modules between a conducting state and a non-conducting state in accordance with a switching period, the apparatus comprising:
a processor including at least one comparator and at least one delay circuit, the processor arranged to:
receive one or more characteristics associated with each of the switching modules;
generate, for each switching module of the plurality of switching modules, an error signal with the comparator that compares a characteristic of a respective switching module with an equivalent characteristic associated with one or more other switching modules of the plurality of switching modules; and
control a time period during which the respective switching module is in its conducting state in accordance with the generated error signal,
wherein the processor is arranged to control the time period by applying a per switching period correction with the delay circuit to correct for problems occurring in each individual switching period and an offset factor to compensate for long-term strains placed on one or more of the switching modules, and wherein the offset factor is summed with the per switching period correction to produce a delay demand that is indicative of an amount by which a switch-on time of each switching module needs to be delayed.

14. A drive unit for providing an AC electricity source for driving a load, the drive unit comprising:
an input arranged to receive a DC electricity source;
an output arranged to produce an AC electricity source for driving a load;
a plurality of switching modules arranged between the input and the output, the plurality of switching modules arranged to receive the DC electricity supply and generate an AC electricity supply for driving the load from the received DC electricity supply, the AC electricity supply being generated by switching of the plurality of switching modules between a conducting state and a non-conducting state; and
the apparatus according to claim 13 configured to control at least one of the plurality of switching modules.

15. The drive unit according to claim 14, wherein a plurality of groups of the plurality of switching modules are provided, wherein each group of the plurality of switching modules has an associated apparatus according to claim 13 and each apparatus according to claim 13 is communicatively coupled.

16. A non-transitory computer readable medium comprising computer readable code operable, in use, to instruct a computer to perform the method of claim 1.

17. The apparatus according to claim 13, wherein the processor is arranged to control the time period by applying the per switching period correction prior to each change of state of the respective switching module.

18. The apparatus according to claim 13, wherein the processor is arranged to control the time period by applying the per switching period correction twice per cycle.

19. The method according to claim 1, wherein applying the per switching period correction includes applying the per switching period correction prior to each change of state of the respective switching module.

20. The method according to claim 1, wherein applying the per switching period correction includes applying the per switching period correction twice per cycle.

* * * * *